C. W. HUNT.
Universal Joint for Hoisting-Block.

No. 210,608. Patented Dec. 10, 1878.

WITNESSES.
Harold T. Van Nostrand
John W. Andrews

INVENTOR.
Charles W. Hunt

UNITED STATES PATENT OFFICE.

CHARLES W. HUNT, OF WEST NEW BRIGHTON, NEW YORK.

IMPROVEMENT IN UNIVERSAL JOINTS FOR HOISTING-BLOCKS.

Specification forming part of Letters Patent No. 210,608, dated December 10, 1878; application filed October 3, 1878.

*To all whom it may concern:*

Figure 1:
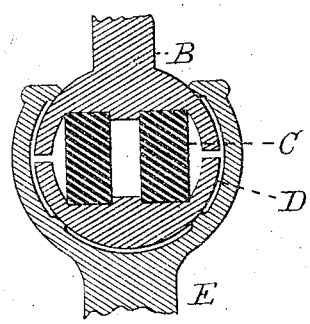
Figure 2:
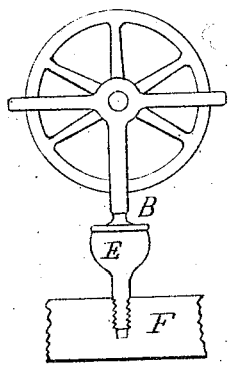
Figure 3:
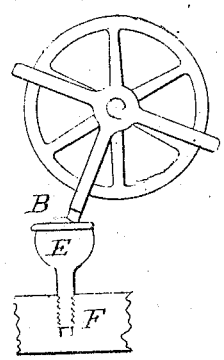
Figure 4:
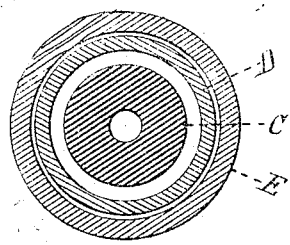

Be it known that I, CHARLES W. HUNT, of West New Brighton, State of New York, have invented new and useful Improvements in Universal Joints for Hoisting-Blocks, whereby the block will stay in any position, and yet easily follow any new direction the hoisting-rope may lead, of which the following is a specification:

In the drawing accompanying this specification, Figure 1 is a section of the joint of the hoisting-block. Fig. 2 is a side elevation with the sheave standing vertically. Fig. 3 is a side elevation with the sheave standing at an angle from the vertical. Fig. 4 is a horizontal cross-section of the joint of the hoisting-block.

The object of this invention is to cause such friction between the ball B D and its envelope E, Fig. 1, that the ball will stay in any position in which it may be placed, and yet be capable of moving to a new position whenever a strain comes upon it greater than the friction between the ball and its envelope.

To avoid the great expense of accurately fitting up this ball and its envelope, so that the friction between them shall be the same in different positions, I divide the ball into two parts, B and D, Fig. 1, and place between the two parts a spring, C, which, by its elasticity, tends to make the ball B D larger, and by its pressure against the rigid envelope E causes the requisite friction to hold it in any desired position. The elasticity of the spring C makes up for slight inequalities in the spherical portions of the ball, and makes the friction practically the same in all positions.

The spring C can be made of any material or of any form that experience may show to be the most suitable for the purpose.

What I claim as my invention is—

The divided ball B D or its equivalent, having a spring, C, which causes the parts of the ball to press against the rigid envelope E, substantially as described.

CHARLES W. HUNT.

Witnesses:
JOHN W. ANDREAS,
HAROLD T. VAN NOSTRAND.